(Model.)
T. A. GALT & G. S. TRACY.
Disk Harrow.
No. 240,993. Patented May 3, 1881.
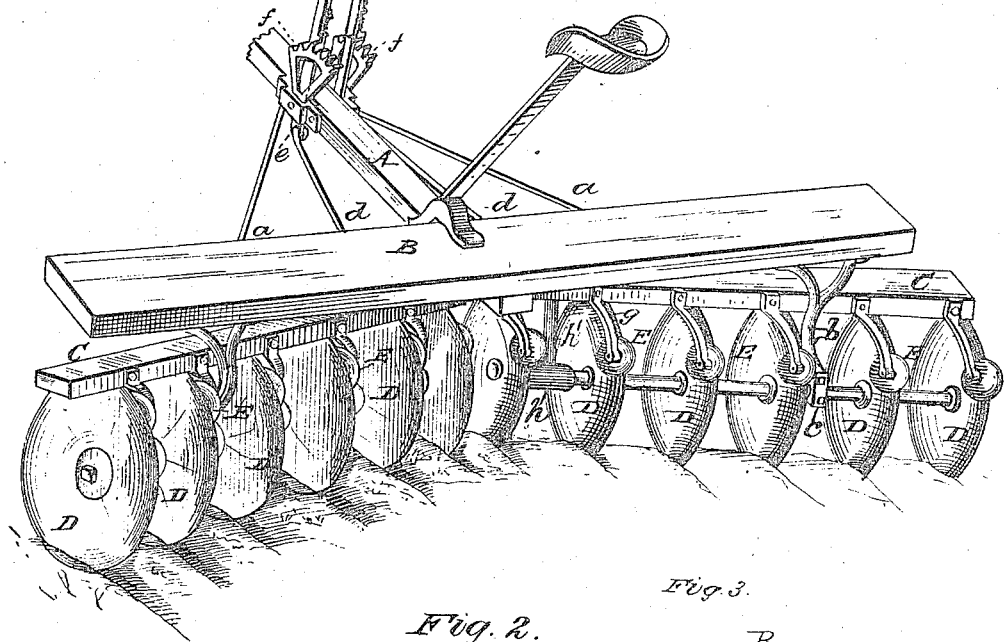
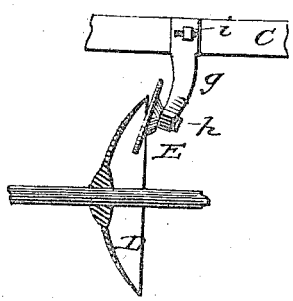
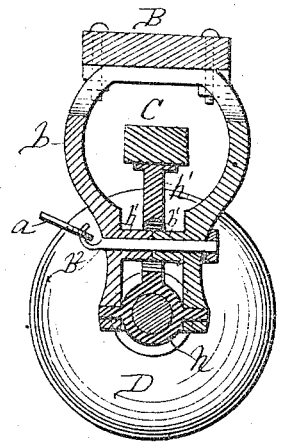
Witnesses
P. C. Dieterich
F. G. Dieterich
Inventors
Thomas A. Galt
George S. Tracy
By Manahan & Ward
Attys

UNITED STATES PATENT OFFICE.

THOMAS A. GALT AND GEORGE S. TRACY, OF STERLING, ILLINOIS.

DISK-HARROW.

SPECIFICATION forming part of Letters Patent No. 240,993, dated May 3, 1881.

Application filed August 5, 1880. (Model.)

*To all whom it may concern:*

Be it known that we, THOMAS A. GALT and GEORGE S. TRACY, citizens of the United States, residing at Sterling, in the county of Whiteside and State of Illinois, have invented certain new and useful Improvements in Disk-Harrows; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention has reference to that class of harrows known as disk-harrows, in which a series of concavo-convex metallic disks having cutting-edges revolve in gangs for the purpose of cutting and pulverizing the earth.

The object of our invention is twofold—first, to provide a simple and effectual mode of changing the relative position of such gangs for the purpose of dislodging accumulations which gather between the interior ends of the gangs; second, the construction and location of a circular rotating scraper to act upon the cutting-edge of each disk, and keep the same free from adhering dirt and everything which would impair its operation and usefulness.

In the drawings, Figure 1 is a rear perspective view of our improved harrow; Fig. 2, a detached sectional view of one of the disks and revolving scraper. Fig. 3 is an enlarged sectional view of the means for suspending the disk-gang shaft from the beams B and C.

A is the tongue of the harrow, centrally attached at right angles to the cross-beam B.

C C are a pair of scraper-bars located under the cross-beam B, and each attached to the axis of one gang of disks by means of loose collars $h$, in which such axis revolves at the lower ends of the pendants $h'$, secured to the under side of beam C.

$b$ represents a forked standard for suspending the disk-gang shaft from the beam B, and which straddles the beam C, and has the collar $h$ journaled in the lowered ends thereof, as clearly shown in Fig. 3, said standard having inwardly-projecting perforated studs $b'$, through which passes a hooked bolt, $b^2$, to which one end of the brace-rod $a$ is secured. This latter attachment is the only connection between the gang of disks and the beam B, and is a doubly-swiveled attachment, permitting a vertical oscillation of the gangs, to enable them to adjust themselves to the inequalities of the ground, and also allowing a second oscillation of the gangs on the plane of the machine. Each gang of disks is held in position by a rod, $a$, extending from the hooked bolt $b^2$ forward, and rigidly attached at its front end to the side of the tongue A.

In order to avoid all side-draft of the machine it is necessary to set both gangs of disks either in one line across the machine or at the same distance from and in the same relation to the draft. It has been found preferable to set the disks with their concave side inward, and in this position the disk on the inner end of each gang throws the dirt and whatever lies upon the ground toward the concavity of the disk on the inner end of the other gang.

In operation, each gang is set with its inner end slightly advanced, thus forming an obtuse angle with the side of the tongue and the other gang, the line of draft being obliquely across the face of the disks D. In this position the interval between the inner ends of the gangs is wider at the front edge of the inner disks than at their rear edge; and where there is sod, stalks, stubble, or other débris, it often results that such accumulate between the concave faces of the two inner end disks, and from the funnel-like conformation of this interval such material will become wedged therein to a degree to prevent the working of the disks, and to require the stoppage of the machine, and considerable labor to remove. It has formerly been sought to overcome this difficulty by setting one gang of disks behind the line of the other; but, as before suggested, this is productive of side draft, and also renders it difficult to guide the machine. It has also been attempted to relieve these accumulations by throwing both gangs of disks simultaneously back into a line with each other by a single lever; but this only lessened the interval between the inner ends of the gangs, and tended to further compress without releasing the obstruction. We obviate this trouble by connecting separate levers to each gang of disks, and, by using one of such levers, throwing the inner end of one of such gangs backward, while the other gang remains in its normal oblique position, thus releasing all accumulations between the inner ends of the gangs, and allowing them to pass out. To accomplish this we attach rods $d$ to the axis of each gang of disks, near the inner end of such axes, and the forward ends of such rods, respectively, are attached pivotally to the lower end $e$ of each upright lever F, which is located conveniently to the seat of the driver. The levers F are fulcrumed on a bolt passing through the tongue A, and are held in any desired position by spring-detents, which engage segments $f$ of ratchet-wheels. The detents are held in place by springs coiled around the levers F, and are withdrawn at the will of the driver by the ordinary gripe-levers fulcrumed to the levers F, near the upper end of the latter. By throwing one of the levers F forward the driver is enabled to throw the inner end of one of the disks back of the corresponding end of the other, the latter remaining with its inner end obliquely forward. By this means the obstructions between the inner ends of the gangs are removed. When the accumulations are thus discharged, by a reverse motion of the lever F the moved gang is advanced to its original position. This operation can be repeated with each gang of disks as often as occasion requires.

In heavy loam and in wet or sticky soils the earth is apt to accumulate and be impressed in the concave sides of the disks D until such disks are thereby rendered inoperative. To prevent this we provide the circular scraper E, having a cutting-edge around its entire periphery, and revolving on its unilateral journal $h$, formed integral therewith in the lower end of the pendant $g$. The scraper has a continuous unbroken rubbing-surface on the side contiguous to the disk, which will prevent the scraper itself from accumulating dirt thereon. The scraper E is located with its outer edge slightly above the outer edge of the disk D, so that the rotary motion of the disk D will impart a like motion to the scraper.

It will be observed that the diameter of the scrapers E does not exceed or is less than one-half the diameter of the disks D, so that they are adapted to be set at such an inclination that the greater portion of the scrapers will extend into the concave side of the disk D and be in contact therewith.

The pendant $g$ is affixed to the rear side of the scraper-beam G by means of a screw-bolt passing through the horizontal slot $i$ in the upper end of such pendant, and by moving the slot $i$ under the bolt the pendant $g$ can be made to approach to or recede from the disk D, and thus the scraper E is adjusted to the disk D, and all wear on the edge of such scraper compensated. In some soils no scraper is needed, and in such case the scraper, by the means aforesaid, can be entirely withdrawn from contact with the disk.

It has heretofore been attempted to keep the cutting-edge of the disk clear by scrapers presenting a stationary edge to such disk; but dried grass and weeds intermixed with mud would gather on the edge of the scraper and wedge in between it and the face of the disk, until it would create great friction, allow an accumulation on the face of the disk, and soon become inoperative. An open revolving scraper has also been used for cleaning the concave face of a revolving mold-board; but such construction of scraper is open to the same objections, as the fibrous roots will get entangled with the radial arms of said scraper, and produce the same results as the scrapers above referred to. The revolving scraper above referred to is further objectionable, for the reason that its diameter, compared with the diameter of the mold-board, is such as to prevent it from being thrown sufficiently into the concave face of the mold-board to properly engage with the surface thereof and be operative.

In our improved scraper we provide an unbroken front surface contiguous to the face of the disk, thus obviating the objections to the open revolving scraper, and we are enabled to throw the greater portion of the scraper inside of and engage with the concave face of the disk, and we thus avoid any accumulation by having a cutting-edge on the scraper, which revolves, and for which reason it is impossible for anything to adhere thereto. The center of that part of the edge of the scraper E which is in contact with the side of the disk is below the axis of the scraper, and therefore the forward motion of that part of the disk E in contact with the scraper imparts to the latter a rotary motion, the effect of the mutual contact being that the edge of the scraper is kept sharp and the edge of the disk kept clean.

The great superiority of the disk-harrow over the old-style spike-harrow is well known to those who have used the former, and the only defects in the former have heretofore been that of accumulations forming in the concavity of the disks and between the inner ends of the gangs. These defects we claim to have most effectually removed by our improvements, hereinbefore described.

It is perhaps not necessary that the scraper E should be an exact circle; but its essential feature is its presenting a movable edge to the side of the disk D.

We are aware that a series of disk-gangs in a revolving harrow or corn-cultivator, and separate levers whereby each disk-gang can be changed to a different angle relatively to the line of draft without interfering with the other disk-gangs or interrupting the operation of the machine, also a series of disk-gangs adapted to be adjusted relatively to the line of draft by a single lever connected to the tongue of the machine, and also a revolving concavo-convex mold-board and a revolving cleaning-scraper, are old, and such we do not wish to be understood as claiming, broadly, as of our invention.

What we claim as our invention, and desire to secure by Letters Patent of the United States, is—

1. In a disk-harrow composed of two gangs of disks having their inner ends contiguous to or approaching each other, substantially as shown, the combination of the two levers F F, fulcrumed on the tongue A, and the rods d d, connecting said levers respectively to each gang of disks, whereby, by means of the separate use of said levers, either gang of disks can be thrown back past the end of the other to discharge intervening obstructions, and be returned to its position without affecting the position of the other gang of disks, substantially in the manner herein shown and described.

2. The combination, with the concavo-convex disk D, of the revolving scraper E, having a continuous unbroken surface on the side contiguous to the concave face of the disk, and arranged so as to be presented to the concave face of the disk and operate between the axle and the periphery thereof, and project slightly beyond said periphery, substantially as and for the purpose herein shown and described.

3. The combination, with the concavo-convex disk D, beam C, and pendant $g$, of the revolving scraper E, having a continuous unbroken surface on the side contiguous to the disk, and a unilateral journal, $h$, mounted in said pendant, said scraper arranged so as to be presented to the concave face of the disk, and operate between the axle and the periphery thereof, and project slightly beyond said periphery, substantially as and for the purpose herein shown and described.

In testimony whereof we affix our signatures in presence of two witnesses.

THOMAS A. GALT.
GEO. S. TRACY.

Witnesses:
J. B. PATTERSON,
GEO. L. WERNTZ.